US007911459B2

(12) United States Patent
Chiou

(10) Patent No.: US 7,911,459 B2
(45) Date of Patent: Mar. 22, 2011

(54) PIXEL CIRCUIT

(75) Inventor: Yu-Wen Chiou, Sinshih Township (TW)

(73) Assignee: Himax Technologies Limited, Sinshih Township (TW)

( * ) Notice: Subject to any disclaimer, the term of this patent is extended or adjusted under 35 U.S.C. 154(b) by 984 days.

(21) Appl. No.: 11/692,268

(22) Filed: Mar. 28, 2007

(65) Prior Publication Data

US 2008/0238891 A1 Oct. 2, 2008

(51) Int. Cl.
*G06F 3/038* (2006.01)
*G09G 5/00* (2006.01)

(52) U.S. Cl. .......................... 345/204; 345/82; 345/214

(58) Field of Classification Search ........................ None
See application file for complete search history.

(56) References Cited

U.S. PATENT DOCUMENTS

2005/0017934 A1* 1/2005 Chung et al. .................... 345/82
2005/0243076 A1* 11/2005 Kim et al. ..................... 345/204
2006/0063298 A1* 3/2006 Winters .......................... 438/99
2006/0066251 A1* 3/2006 Sim ............................ 315/169.3
2006/0114196 A1* 6/2006 Shin et al. ....................... 345/76
2007/0296672 A1* 12/2007 Kim et al. ....................... 345/92

* cited by examiner

*Primary Examiner* — Amare Mengistu
*Assistant Examiner* — Antonio Xavier

(57) ABSTRACT

A pixel circuit has a light emitting diode, a driving transistor, a capacitor, and a first switch. The light emitting diode had a first end to receive a first supply voltage. The driving transistor has a source and drain respectively receiving a second supply voltage and coupled to a second end of the light emitting diode. The capacitor has a first end coupled to a gate of the driving transistor and a second end receiving a reference voltage. The first switch is controlled by a first scan signal to couple the source of the driving transistor to the second end of the capacitor. The pixel circuit operates in a pre-charge period, a programming period, and an emission period sequentially, and the first scan signal is asserted to turn on the first switch during the pre-charge and emission periods.

18 Claims, 5 Drawing Sheets

PIXEL CIRCUIT

BACKGROUND

1. Field of Invention

The present invention relates to a pixel circuit, and more particularly relates to an AMOLED compensation pixel circuit with improved IR drop.

2. Description of Related Art

FIG. 1 shows an organic light emitting diode pixel circuit of the prior art. The pixel circuit is a voltage type pixel circuit. The pixel circuit has a light emitting diode 110, a driving transistor 130, a capacitor 150, and a first switch 170. The light emitting diode 110 has a first end 112 receiving a first supply voltage 120. The driving transistor 130 has a source 132 and a drain 136 respectively receiving a second supply voltage 140 and coupled to a second end 116 of the light emitting diode 110 through the first switch 170. The capacitor 150 has a first end 151 coupled to a gate 134 of the driving transistor 130 and a second end 152 receiving the second supply voltage 140. The first switch 170 is controlled by a first scan signal (SN1) to couple the drain 136 of the driving transistor 130 to the second end 116 of the light emitting diode 110.

The pixel circuit has a second switch 180 controlled by a second scan signal (SN2) to couple a data line 185 to the pixel circuit through a transistor 187.

The transistor 190 is controlled by the first scan signal from the neighbor data line (SN1-1). The transistors 187 and 190 are arranged to compensate the driving voltage when the pixel circuit operates.

The drawback of the conventional pixel circuit is that it has an IR drop issue. Especially when the panel display gets bigger, the IR drop issue gets worse.

SUMMARY

According to one embodiment of the present invention, the pixel circuit has a light emitting diode, a driving transistor, a capacitor, and a first switch. The light emitting diode had a first end to receive a first supply voltage. The driving transistor has a source and drain respectively receiving a second supply voltage and coupled to a second end of the light emitting diode. The capacitor has a first end coupled to a gate of the driving transistor and a second end receiving a reference voltage. The first switch is controlled by a first scan signal to couple the source of the driving transistor to the second end of the capacitor. The pixel circuit operates in a pre-charge period, a programming period, and an emission period sequentially, and the first scan signal is asserted to turn on the first switch during the pre-charge and emission periods.

According to another embodiment of the present invention, the display panel has several pixel circuits coupled to a first scan line and a second scan line. The pixel circuits are respectively coupled to several data lines. Each pixel circuit has a light emitting diode, a driving transistor, a capacitor, and a first switch. The light emitting diode has a first end to receive a first supply voltage. The driving transistor has a source and drain respectively receiving a second supply voltage and coupled to a second end of the light emitting diode. The capacitor has a first end coupled to a gate of the driving transistor and a second end receiving a reference voltage. The first switch is controlled by a first scan signal to couple the source of the driving transistor to the second end of the capacitor. The pixel circuit operates in a pre-charge period, a programming period, and an emission period sequentially, and the first scan signal is asserted to turn on the first switch during the pre-charge and emission periods.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
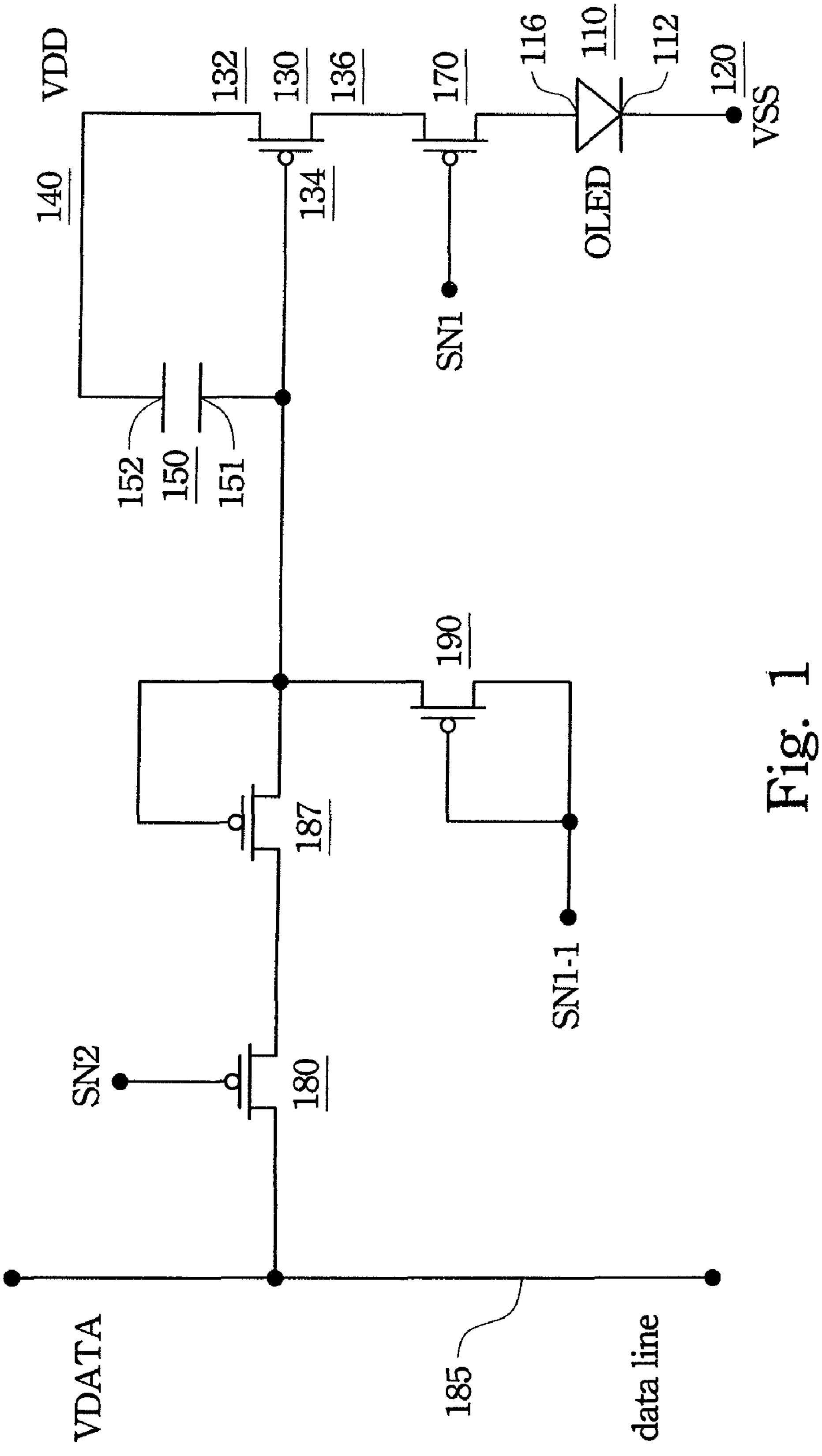
Fig. 1 (prior art)
FIG. 1 shows an organic light emitting diode pixel circuit of the prior art.

Reference will now be made in detail to the present preferred embodiments of the invention, examples of which are illustrated in the accompanying drawings. Wherever possible, the same reference numbers are used in the drawings and the description to refer to the same or like parts.

Figure 2:
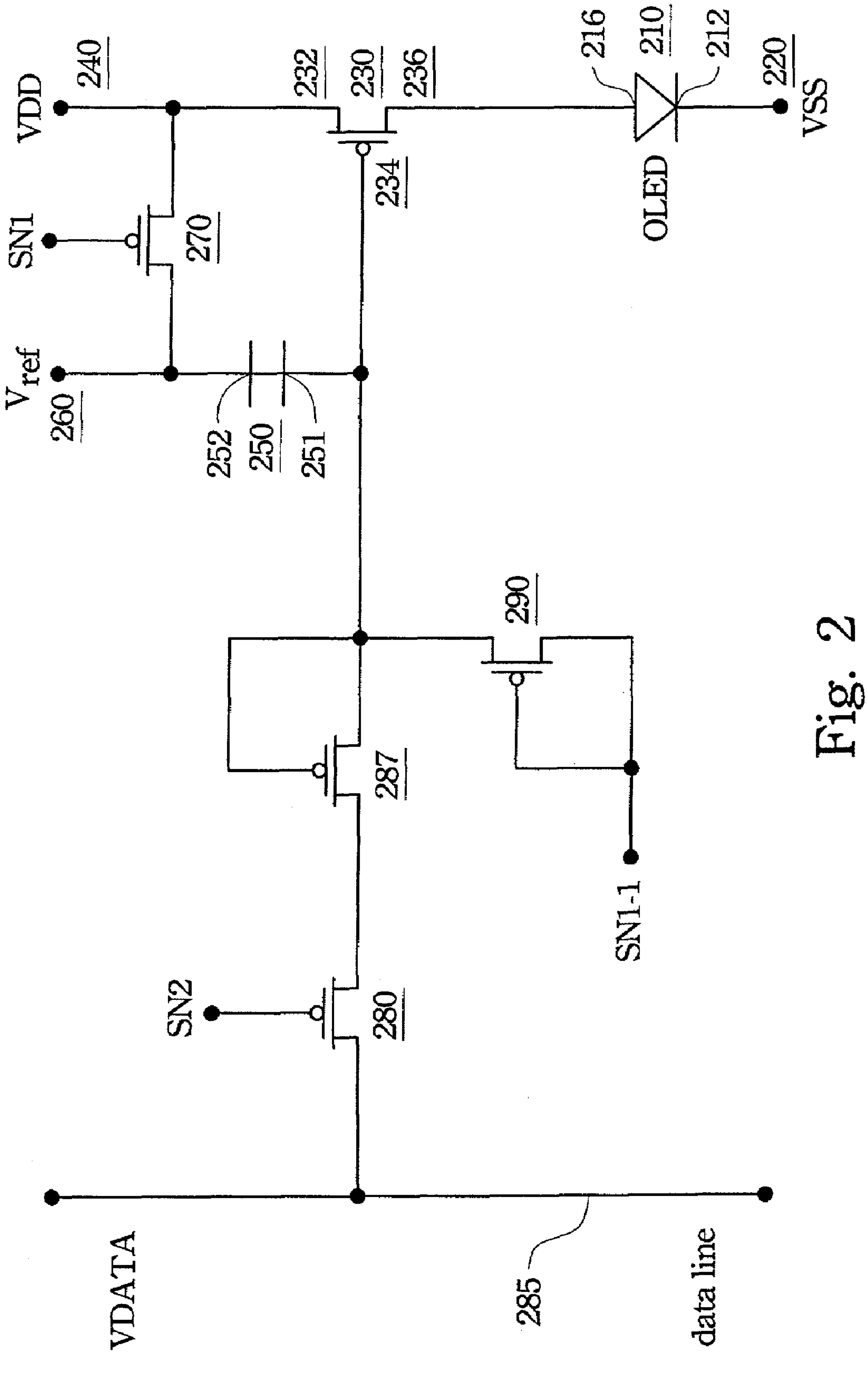
FIG. 2 shows an organic light emitting diode pixel circuit according to an embodiment of the invention.

FIG. 2 shows an organic light emitting diode pixel circuit according to an embodiment of the invention. The pixel circuit is a voltage type pixel circuit. The pixel circuit has a light emitting diode 210, a driving transistor 230, a capacitor 250, and a first switch 270. The light emitting diode 210 has a first end 212 receiving a first supply voltage 220. The driving transistor 230 has a source 232 and a drain 236 respectively receiving a second supply voltage 240 and coupled to a second end 216 of the light emitting diode 210. The capacitor 250 has a first end 251 coupled to a gate 234 of the driving transistor 230 and a second end 252 receiving a reference voltage 260. A first scan signal (SN1) is applied to control the first switch 270 whether couples the source 232 of the driving transistor 230 to the second end 252 of the capacitor 250 or not.

The pixel circuit has a second switch 280 controlled by a second scan signal (SN2) to couple a data line 285 to the pixel circuit through a transistor 287. Therefore, when the second scan signal is asserted, the data signals from the data line 285 are transmitted to the pixel circuit.

The transistor 290 is controlled by the first scan signal from the neighbor data line (SN1-1). The transistors 287 and 290 are arranged to compensate the driving voltage when the pixel circuit operates.

Moreover, the first supply voltage 220 at the first end 212 of the light emitting diode 210 is a ground voltage (VSS). The first switch 270 and the second switch 280 can be implemented by transistors. In the embodiment shown in the FIG. 2, the switches 270 and 280 are PMOS transistors. If the switches 270 and 280 are configured by NMOS transistors, the control signals have to be inverted.

Figure 3:
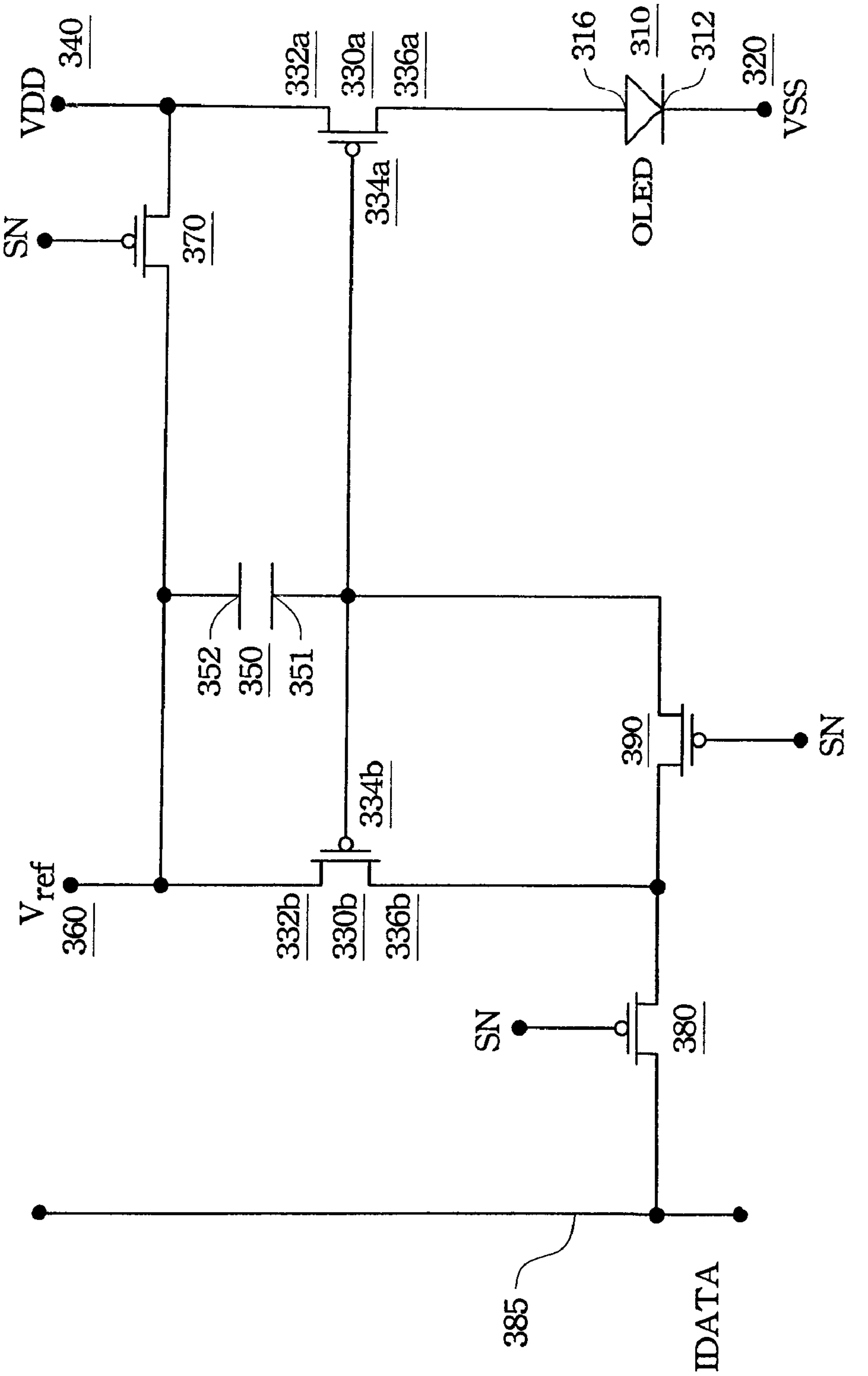
FIG. 3 shows an organic light emitting diode pixel circuit according to another embodiment of the invention.

FIG. 3 shows an organic light emitting diode pixel circuit according to another embodiment of the invention. The pixel circuit is a current type pixel circuit. The pixel circuit has a light emitting diode 310, driving transistors 330*a* and 330*b*, a capacitor 350, and a first switch 370. The light emitting diode 310 has a first end 312 receiving a first supply voltage 320. The driving transistor 330*a* has a source 332*a* and a drain 336*a* respectively receiving a second supply voltage 340 and coupled to a second end 316 of the light emitting diode 310. The capacitor 350 has a first end 351 coupled to a gate 334*a* of the driving transistor 330*a* and a second end 352 receiving a reference voltage 360. The first switch 370 is controlled by a scan signal (SN) to couple the source 332*a* of the driving transistor 330*a* to the second end 352 of the capacitor 350. The driving transistor 330*b* has a source 332*b* and a gate 334*b* respectively receiving the reference voltage 360 and coupled to the gate 334*a* of the driving transistor 330*a*.

The pixel circuit has a second switch 380 controlled by the scan signal to couple a data line 385 to the pixel circuit. Therefore, when the scan signal is asserted, the data signals from the data line 385 are transmitted to the pixel circuit. The transistor 390 is controlled by the scan signal to couple a drain 336*b* and the gate 334*b* of the driving transistor 330*b* together.

Figure 4:
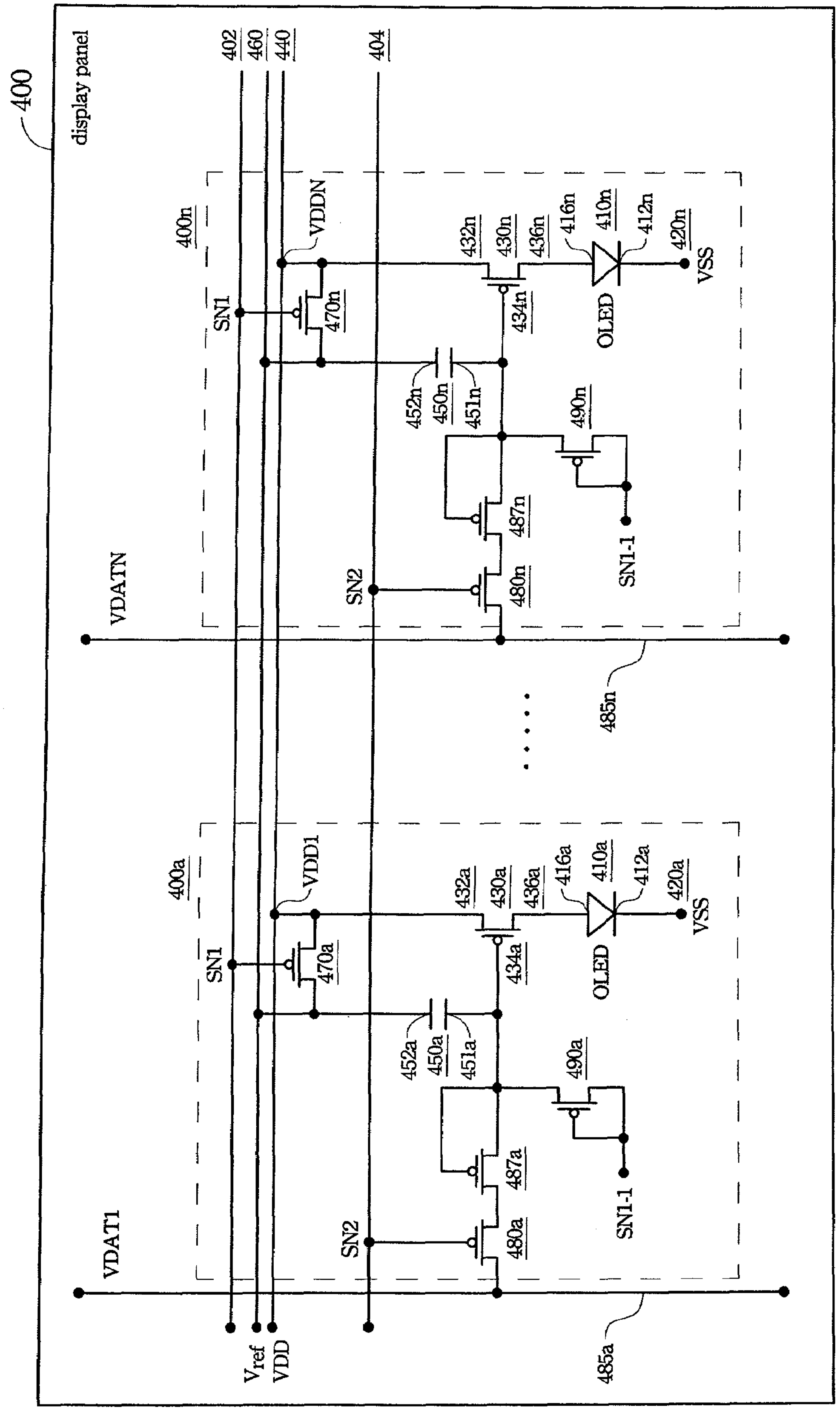
FIG. 4 shows an organic light emitting diode pixel circuit according to another embodiment of the invention.

FIG. 4 shows an organic light emitting diode pixel circuit according to another embodiment of the invention. The display panel 400 has several pixel circuits (such as pixel circuits 400*a* and 400*n*) coupled to a first scan line 402 and a second scan line 404. The pixel circuits are respectively coupled to several data lines. For example, the pixel circuits 400*a* and 400*n* are respectively coupled to the data lines 485*a* and 485*n*. Take pixel circuits 400*a* for example; the pixel circuit 400*a* has a light emitting diode 410*a*, a driving transistor 430*a*, a capacitor 450*a*, and a first switch 470*a*. The light emitting diode 410*a* has a first end 412*a* receiving a first supply voltage 420*a*. The driving transistor 430*a* has a source 432*a* and drain 436*a* respectively receiving a second supply voltage 440 and coupled to a second end 416*a* of the light emitting diode 410*a*. The capacitor 450*a* has a first end 451*a* coupled to a gate 434*a* of the driving transistor 430*a* and a second end 452*a* receiving a reference voltage 460. A first scan signal (SN1) is applied to control the first switch 470*a* whether couples the source 432*a* of the driving transistor 430*a* to the second end 452*a* of the capacitor 450*a* or not.

The pixel circuit 400*a* has a second switch 480*a* controlled by a second scan signal (SN2) to couple a data line 485*a* to the pixel circuit through a transistor 487*a*. Therefore, when the second scan signal is asserted, the data signals from the data line 485*a* are transmitted to the pixel circuit.

The transistor 490*a* is controlled by the first scan signal from the neighbor data line (SN1-1). The transistors 487*a* and 490*a* are arranged to compensate the driving voltage when the pixel circuit operates.

Moreover, the first supply voltage 420*a* at the first end 412*a* of the light emitting diode 410*a* is a ground voltage (VSS). The first switch 470*a* and the second switch 480*a* can be implemented by transistors. In this embodiment shown in the FIG. 4, the switches 470*a* and 480*a* are PMOS transistors. If the switches 470*a* and 480*a* are configured by NMOS transistors, the control signals have to be inverted. The pixel circuit 400*n* has the corresponding configuration of the pixel circuit 400*a*.

Figure 5:
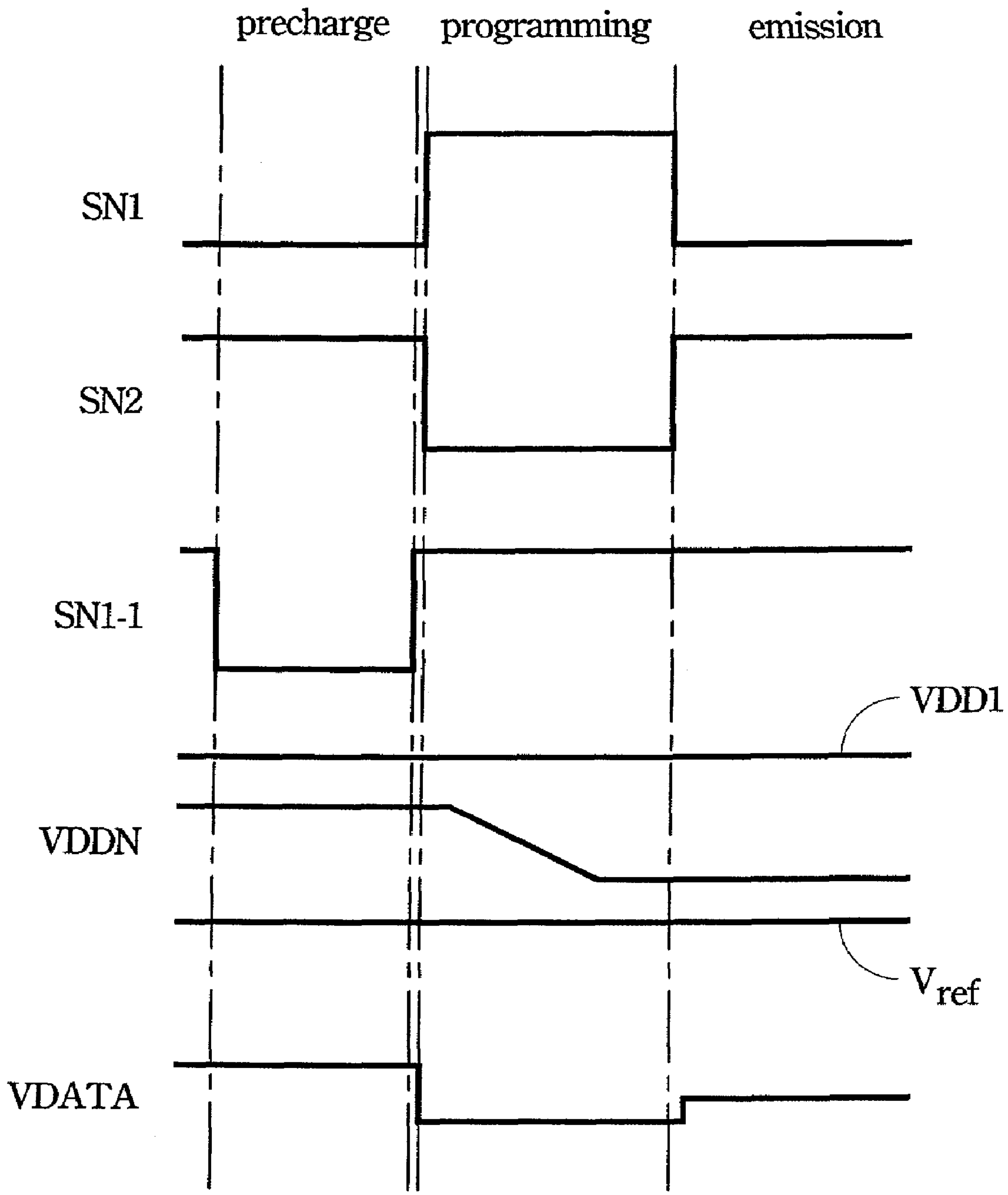
FIG. 5 shows the waveform diagrams of the signals of the embodiment shown in FIG. 4.

FIG. 5 shows the waveform diagrams of the signals of the embodiment shown in FIG. 4. The pixel circuit operates in a pre-charge period, a programming period, and an emission period sequentially. The second scan signal SN2 is asserted to turn on the second switch 480*a* during the programming period, and de-asserted to turn off the second switch 480*a* during the pre-charge and emission periods. The first scan signal SN1 is asserted to turn on the first switch 470*a* during the pre-charge and emission periods, and de-asserted to turn off the first switch 470*a* during the programming period. Namely, the first scan signal (SN1) is an inverted signal of the second scan signal (SN2).

In the display panel 400, the power source terminals of the second supply voltage 440 locate at the left side of the display panel 400. Therefore, when the distance between the pixel circuit and the left side of the display panel 400 increases, the voltage drop (IR drop) of the second supply voltage 440 increases. Namely, the voltage of the second supply voltage 440 in the pixel circuit 400*n* (VDDN) is lower than that of the pixel circuit 400*a* (VDD1). That is why the ordinary display panel has the IR drop issue.

Therefore, when the switch 470*n* is turned on by the first scan signal (SN1) in the pre-charge and emission periods, the reference voltage 460 can prevent the second supply voltage 440 in the pixel circuit 400*n* (VDDN) from falling bellow the reference voltage 460 ($V_{ref}$). The IR drop issue is improved thereby.

Moreover, when the switch 470*n* is turned off by the first scan signal (SN1) in the programming period, the capacitor 450*n* is isolated from the light emitting diode 410*n*, and the data signals from the data line 485*n* are written into the capacitor 450*n* more efficiently.

Furthermore, a level of the reference voltage 460 is selected for a specific voltage range of a data signal. Namely, the reference voltage 460 can adjust the required voltages of the data signals written into the capacitors in the programming period. For example, if the voltage difference between two ends 451*n* and 452*n* of the capacitor 450*n* during the programming period is 5 volts, and the reference voltage 460 is 10 volts, therefore the required voltage of the data signal written into the capacitor 450*n* is 5 volts. If the reference voltage 460 is 9 volts, the required voltage of the data signal written into the capacitor 450*n* is just 4 volts. Thus, the low reference voltage 460 enables the pixel circuit to be driven by the drivers with low voltage data signals. The power consumption of the pixel circuit and the cost of the drivers and panels are reduced thereby.

By the description above, the embodiments of this invention with the voltage compensation function use the reference voltage cooperated with the switch connected thereof to improve the IR drop issue and reduce the power consumption by adjust the voltage of data signals.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel circuit, comprising:

a light emitting diode with a first end for receiving a first supply voltage;

a driving transistor with a source and drain for respectively receiving a second supply voltage and coupled to a second end of the light emitting diode;

a capacitor with a first end coupled to a gate of the driving transistor and a second end directly coupled to a reference voltage; and a first switch controlled by a first scan signal to couple the source of the driving transistor directly to the reference voltage;

wherein the pixel circuit is configured to operate in a pre-charge period, a programming period, and an emission period sequentially, and the first scan signal is configured to turn on the first switch during the pre-charge and emission periods.

2. The pixel circuit as claimed in claim 1, further comprising a second switch controlled by a second scan signal to couple a data line to the pixel circuit.

3. The pixel circuit as claimed in claim 2, wherein the second scan signal is asserted to turn on the second switch during the programming period.

4. The pixel circuit as claimed in claim 2, wherein the first scan signal is an inverted signal of the second scan signal.

5. The pixel circuit as claimed in claim 1, wherein a level of the reference voltage is selected for a specific voltage range of a data signal.

6. The pixel circuit as claimed in claim 1, wherein the first supply voltage is a ground voltage.

7. The pixel circuit as claimed in claim 1, wherein the first switch includes a transistor.

8. The pixel circuit as claimed in claim 1, wherein the pixel circuit is a voltage type pixel circuit.

9. The pixel circuit as claimed in claim 1, wherein the pixel circuit is a current type pixel circuit.

10. A display panel, comprising:

a plurality of pixel circuits coupled to a first scan line and a second scan line, and respectively coupled to a plurality of data lines, wherein each pixel circuit comprises:

a light emitting diode with a first end for receiving a first supply voltage;

a driving transistor with a source and drain for respectively receiving a second supply voltage and coupled to a second end of the light emitting diode;

a capacitor with a first end coupled to a gate of the driving transistor and a second end directly coupled to a reference voltage; and a first switch controlled by a first scan signal to couple the source of the driving transistor directly to the reference voltage;

wherein the pixel circuit operates in a pre-charge period, a programming period, and an emission period sequentially, and the first scan signal is configured to turn on the first switch during the pre-charge and emission periods.

11. The display panel as claimed in claim 10, further comprising a second switch controlled by a second scan signal to couple a data line to the pixel circuit.

12. The display panel as claimed in claim 11, wherein the second scan signal from the second scan line is asserted to turn on the second switch during the programming period.

13. The display panel as claimed in claim 11, wherein the second scan signal from the second scan line is asserted to turn on the second switch during the programming period.

14. The display panel as claimed in claim 10, wherein a level of the reference voltage is selected for a specific voltage range of a data signal.

15. The display panel as claimed in claim 10, wherein the first supply voltage is a ground voltage.

16. The display panel as claimed in claim 10, wherein the first switch includes a transistor.

17. The display panel as claimed in claim 10, wherein the pixel circuit is a voltage type pixel circuit.

18. The display panel as claimed in claim 10, wherein the pixel circuit is a current type pixel circuit.

* * * * *